United States Patent [19]

Collins et al.

[11] Patent Number: 5,286,808

[45] Date of Patent: Feb. 15, 1994

[54] ELASTOMERIC CROSSLINKED POLY(1,3-DIOXLANE)

[75] Inventors: George L. Collins, Maplewood; William M. Pleban, Stanhope; Paul Zema, Fanwood, all of N.J.

[73] Assignee: Hoechst Celanese Corp., Somerville, N.J.

[21] Appl. No.: 735,486

[22] Filed: Jul. 25, 1991

[51] Int. Cl.$^5$ .............................................. C08L 29/14
[52] U.S. Cl. ..................................... 525/401; 525/398; 528/230; 528/245.3; 528/249; 528/403; 528/405; 528/406; 528/418; 528/421
[58] Field of Search ................ 525/401, 398; 526/398; 528/403, 405, 406, 418, 421, 230, 245.3, 249

[56] References Cited

U.S. PATENT DOCUMENTS

| | | | |
|---|---|---|---|
| 3,393,157 | 7/1968 | Janssen et al. | 528/403 |
| 3,422,035 | 2/1969 | May et al. | 528/403 |
| 4,898,925 | 2/1990 | Collins et al. | 525/407 |
| 4,937,312 | 6/1990 | Collins et al. | 525/405 |

Primary Examiner—James J. Seidleck
Assistant Examiner—W. R. H. Clark
Attorney, Agent, or Firm—James L. McGinnis

[57] ABSTRACT

Crosslinked elastomeric acetal polymers are made by the copolymerization of 1,3-dioxolane with a smaller amount of one or more bifunctional monomers The two functional groups of the bifunctional monomer react under the same cationic polymerization conditions as the 1,3-dioxolane. The elastomeric acetal polymer does not crystallize even when the temperature is as low as −50° C. The elastomeric acetal polymer is particularly useful for blending with crystalline acetal polymers to yield a composition with improved impact resistance.

5 Claims, No Drawings

ELASTOMERIC CROSSLINKED POLY(1,3-DIOXLANE)

FIELD OF THE INVENTION

This invention relates to elastomeric acetal polymers that are crosslinked. The invention relates further to blends of crystalline acetal polymers with the crosslinked elastomeric acetal polymers.

BACKGROUND OF THE INVENTION

Acetal polymers have been in commercial use for many years. These polymers have oxymethylene repeat units as a major part of their backbone. They are widely used in molding compositions, which have been utilized in many applications, such as automobile bumper extensions and instrument panels; plumbing supplies, such as valves, shower assemblies, flush tank components, faucets and pipe fittings; tool components; and household and personal products.

These crystalline acetal polymers have excellent physical properties. However, for certain applications, improved impact resistance would be highly desirable. Typically, impact strength of a crystalline polymer is improved by blending the crystalline polymer with an elastomer to form shock-absorbing rubbery domains in the crystalline polymer. This approach to impact resistance is most successful when there is a strong interaction between the surface of the rubbery domains and the crystalline polymer.

A limited number of acetal copolymers have recently been synthesized wherein the compositions yield a non-crystalline acetal. The chemical structures are similar enough to the crystalline acetals to interact well with them. For example, commonly assigned U.S. Pat. No. 4,788,258 discloses acetal copolymers derived from trioxane and 1,3-dioxolane, with the 1,3-dioxolane content being between about 65 and 75 mol percent of the polymer based on the total monomer composition. These polymers have a glass transition temperature that is less than about $-60°$ C. Blends of these non-crystalline copolymers with crystalline acetal polymers show improved impact resistance over that of the unblended crystalline acetals. Copending and commonly assigned U.S. Ser. No. 406,641 discloses acetal copolymers made from 1,3-dioxolane and 1,3-dioxepane. These copolymers are non-crystalline and have glass transition temperatures which are as low as $-120°$ C. and below. Blends of these copolymers with crystalline acetal polymers also exhibit improved impact resistance.

The elastomeric acetal polymers described above are thermoplastic materials which readily deform under stress. Very few elastomeric acetal polymers have been reported which are crosslinked or can be crosslinked. One example of a crosslinkable acetal polymer has been disclosed in commonly assigned U.S. Pat. No. 4,758,608. This polymer is synthesized from trioxane, 1,3-dioxolane, and a formal of a monoethylenically unsaturated aliphatic diol. This polymer can be cured with a multifunctional crosslinking monomer in the presence of ultraviolet light to yield an insoluble, rubbery, nontacky polymer which is useful for blending with crystalline acetal polymers.

A crosslinked elastomeric acetal polymer composition has also been disclosed in commonly assigned U.S. Pat. No. 4,898,925. The polymer is made from trioxane, 1,3-dioxolane, and about 0.005% to about 0.15% of a bifunctional monomer, such as 1,4-butanediol diglycidyl ether or butadiene diepoxide. This polymer exhibits improved elastomeric properties. When it is blended with crystalline acetal polymers, the blend has improved properties compared with the properties of the unblended acetal polymer.

Additional elastomeric acetal compositions are needed, especially ones that are crosslinked so that they are not thermoplastic. These are particularly useful for the purpose of expanding the range of impact-modified blends of crystalline acetal polymers. A novel, crosslinked elastomeric acetal is disclosed herein. The fact that this material is non-crystalline is particularly surprising and unexpected, since the analogous composition which does not incorporate a crosslinking monomer is crystalline.

SUMMARY OF THE INVENTION

A crosslinked elastomeric acetal polymer is disclosed which is a copolymer of 1,3-dioxolane and one or more bifunctional monomers. The bifunctional monomers have two functional groups that react under conditions of cationic polymerization. Examples of reactive functional groups that may be used include epoxides, glycidyl ethers, glycidyl esters, cyclic ethers, vinyl ethers, vinyl esters, acrylate esters, methacrylate esters, allyl ethers, and allyl esters. A particularly effective bifunctional monomer is 2,3-epoxypropyl acrylate. The amounts of 1,3-dioxolane and bifunctional monomer are chosen so that the polymer is non-crystalline at room temperature. The bifunctional monomers are included as about 1% to about 20% by volume of the starting monomers and, more preferably, about 5% to about 10% of the volume of starting monomers.

A method for making the polymers is also taught in which a solution of the 1,3-dioxolane and bifunctional monomers is treated with a cationic polymerization catalyst and heated to effect polymerization. The cationic polymerization catalysts are preferably Lewis acids, with p-nitrobenzenediazonium tetrafluoroborate and boron trifluoride etherate being particularly effective. The preferred polymerization temperature is about 55° C.

The crosslinked elastomeric acetal polymers are useful for blending with crystalline acetal polymers to produce impact-modified blends. The crystalline acetal polymer can be an end-capped oxymethylene homopolymer or a copolymer of oxymethylene groups interspersed with oxy(higher alkylene) groups. Crystalline acetal copolymers are generally polymers of trioxane and either 1,3-dioxolane or ethylene oxide. The preferred crystalline acetal copolymer is made from about 98% trioxane and 2% ethylene oxide. The crosslinked elastomeric acetal polymers can also be blended with crystalline acetal terpolymers, such as the terpolymer of trioxane, ethylene oxide, and the diglycidyl ether of 1,4-butanediol. The blends of crosslinked elastomeric acetal polymers and crystalline acetal polymer can be further modified by including such additives as plasticizers, formaldehyde scavengers, nucleating agents, mold lubricants, antioxidants, fillers, colorants, pigments, reinforcing agents, light stabilizers, and other stabilizers. These blends all have improved impact properties.

DETAILED DESCRIPTION OF THE INVENTION

The crosslinked elastomeric acetal polymers of the present invention are made by the ring-opening copolymerization of 1,3-dioxolane and one or more bifunctional monomers that act as crosslinking agents. Minor amounts of other cyclic acetals can also be included in the composition. Surprisingly, it has been discovered that these polymers are elastomeric and non-crystalline at room temperature despite the fact that the polymer of 1,3-dioxolane is crystalline.

1,3-Dioxolane is well known and is readily made by one of ordinary skill in the art. It is also commercially available. Ring-opening polymerization of 1,3-dioxolane without other comonomers yields a copolymer that contains an approximately equal number of oxymethylene units and oxyethylene units. Oxymethylene units have the formula $$-OCH_2-$$

Oxyethylene units have the formula $$-OCH_2CH_2-$$

Therefore, when dioxane is polymerized with a small amount of a bifunctional crosslinking agent according to the present invention, somewhat less than 50% of the monomer repeat units will be oxymethylene units. The polymer on that basis can be classified as an acetal polymer. Small amounts of other cyclic acetal monomers can also be included in the composition as long as they do not cause the acetal polymer to become crystalline. These monomers include, for example, trioxane, 1,3-dioxepane, and 4,7-dihydro-1,3-dioxepin.

The bifunctional monomers have 2 reactive functional groups that can be incorporated into the growing polymer chains during the polymerization so that they act as crosslinking agents. Schematically, the bifunctional monomers can be represented by the formula $$X-R-Y$$

where X and Y are the reactive functional groups. X and Y can be the same or different, and they can be any functionality that is reactive under cationic polymerization conditions. Examples of suitable reactive functional groups include epoxides, glycidyl ethers, glycidyl esters, cyclic ethers, vinyl ethers, acrylate esters, methacrylate esters, vinyl esters, allyl ethers, and allyl esters. R can be any disubstituted linkage that is inert under the conditions of cationic polymerization. R can thus be an aliphatic hydrocarbon chain, an alicyclic or aromatic ring, or a combination of these, optionally substituted with non-reactive substituents such as halogen atoms or alkyl or aryl moieties. R can also contain ester or amide linkages.

Examples of bifunctional monomers include 1,4-divinyloxybutane, 1,6-hexanediol diacrylate or dimethacrylate, 1,6-hexanediol diglycidyl ether, 1,6-divinyloxyhexane, the divinyl ester of sebacic acid, 1,4-butanediol diglycidyl ether, 1,4-butanediol diacrylate or dimethacrylate, butadiene diepoxide, 2,3-epoxypropyl acrylate, diethylene glycol diacrylate and dimethacrylate, triethylene glycol diglycidyl ether, the bis(vinyl ether) of diethylene glycol, 1,10-decanediol diglycidyl ether, and the like. Mixtures of more than one bifunctional monomer may be used. A bifunctional monomer that has proved particularly effective in producing the novel elastomeric acetals of the current invention is 2,3-epoxypropyl acrylate. These bifunctional monomers are made by methods well known in the art. Many are commercially available, including 2,3-epoxypropyl acrylate. The bifunctional monomer should be present in a smaller amount than the 1,3-dioxolane, in the range of about 1% to about 20% by volume of the combined volume of the two monomers, and preferably in the range of about 5% to about 10% by volume of the combined volume of the two monomers.

To achieve high molecular weights, the polymerization reactions must be carried out with rigorous exclusion of moisture. Even small amounts of water catalyze chain transfer reactions that lower the molecular weight. The reactants are thus rigorously dried before polymerization by methods well known in the art. 1,3-Dioxolane, for example, is distilled immediately before use from sodium/potassium alloy and collected under dry nitrogen or argon over molecular sieves. The polymerization reactions are carried out under a dry, inert atmosphere, as for example nitrogen or argon. All manipulations of catalysts and reactants, as, for example, weighing, are carried out under a dry, inert atmosphere.

The polymerization reactions can be carried out in solvents, but it is far more convenient to carry out the polymerizations without solvent. The catalysts that are used are cationic polymerization catalysts. These include strong Bronsted acids, such as trifluoromethanesulfonic acid (triflic acid) or p-toluenesulfonic acid. Lewis acids, such as p-nitrobenzenediazonium tetrafluoroborate, boron trifluoride, or phosphorous pentafluoride, can also be used as catalysts. Lewis acid catalysts are more effective, and thus are preferred, particularly p-nitrobenzenediazonium tetrafluoroborate and boron trifluoride etherate. The concentrations of catalysts can vary over a wide range. Higher concentrations generally lead to lower molecular weight, whereas concentrations that are too low can lead to incomplete reaction of the monomer. Catalyst should be added to the reactant in a sufficient quantity that the concentration of catalyst is in the range of about 0.01M to about 0.0001M, with a concentration of about 0.001M being preferred. In order to facilitate the accurate measurement of the very small quantities of catalyst that are used, it is generally convenient to make a solution of known concentration of catalyst in a dry, inert solvent, such as nitromethane, and then add the catalyst solution volumetrically.

The polymerization reactions are carried out at atmospheric pressure under temperatures that range from room temperature to about 75° C. The temperature chosen depends on the catalyst that is used. For the preferred catalysts, p-nitrobenzenediazonium tetrafluoroborate or boron trifluoride etherate, the preferred polymerization temperature is in the range of about 50° C. to about 60° C., with a temperature of about 55° C. being most preferred. After reaction, the polymer can be purified by dissolving it in methylene chloride and then precipitating it with a non-solvent, such as ethanol. Alternatively, the polymer can be removed as a mass from the flask by freezing the polymer in liquid nitrogen and then breaking the flask.

The polymer obtained from the reaction is very rubbery, transparent, and yellow in color. The polymer remains non-crystalline at temperatures well below room temperature. Analysis by differential scanning calorimetry (DSC) shows the polymer to be non-crystalline, even when it is cooled to −50° C. For comparison, poly(1,3-dioxolane), the ring-opening polymer of 1,3-dioxolane, can be made by an analogous procedure. Poly(1,3-dioxolane), which differs from the composition disclosed herein only in the lack of a crosslinking agent, is crystalline at room temperature. In fact, DSC analysis of poly(1,3-dioxolane) shows a crystalline melting point at 61° C. The fact that such a large change in physical properties occurs because a crosslinking agent is present at about 5% to about 10% of the composition by volume is indeed surprising.

The rubbery polymers of the current invention are particularly useful for blending with crystalline acetal polymers. Because somewhat less than 50% of the molecular repeat units are oxymethylene units, these polymers are expected to interact well with crystalline acetal polymers, which have a much higher concentration of oxymethylene units. The polymers disclosed herein will thus form stable blends with crystalline acetal polymers. The blends can have a broad range of elastomeric acetal polymer, but generally will contain about 2% to about 30% of the elastomeric acetal polymer. The blends will have improved physical properties, particularly impact resistance, because of the presence of the stable, rubbery domains. These blends are particularly useful as molding resins for making shaped articles in structural applications. The crystalline acetal polymers with which the elastomeric acetals are blended are described below.

The difference in composition between the crosslinked elastomeric acetals and crystalline acetals is that the elastomeric acetals disclosed herein contain oxymethylene repeat units as somewhat less than 50% of the monomer units in the polymer composition, whereas the highly crystalline acetals generally contain oxymethylene repeat units as greater than 85% of the monomer units in the polymer composition.

The crystalline acetal polymers are commercially available from a number of manufacturers as homopolymers, copolymers, terpolymers, etc. These highly crystalline acetals, described briefly hereinbelow, are well known in the art and have been reviewed extensively. For example, a review of acetals can be found in an article by T. J. Dolce and J. A. Grates entitled, "Acetal Resins," pp. 42–61 in *Encyclopedia of Polymer Science and Engineering*, Vol. 1, John Wiley and Sons, New York, 1985. Additional information on acetal copolymers and terpolymers can also be found in U.S. Pat. No. 4,758,608, incorporated herein by reference.

Typically, acetal homopolymers, or poly(oxymethylenes), are prepared by polymerizing anhydrous formaldehyde or trioxane. Oxymethylene homopolymers are usually stabilized against thermal degradation by endcapping with, for example, ester or ether groups, such as those derived from alkanoic anhydrides (for example, acetic anhydride) or dialkyl ethers (for example, dimethyl ether) or by incorporating stabilizer compounds into the homopolymer. Commercially available acetal homopolymer is made by polymerizing anhydrous formaldehyde in the presence of an initiator, after which the polymer is endcapped by acetylation of the hemiacetal end groups with acetic anhydride in the presence of sodium acetate catalyst. Methods for making and end-capping acetal homopolymers are taught in U.S. Pat. Nos. 2,768,994 and 2,998,409. Acetal homopolymer is commercially available under the trademarks Delrin ® and Tenac ®.

Acetals which are especially suitable for use in the blends of the present invention are crystalline oxymethylene copolymers having repeat units which consist essentially of oxymethylene groups interspersed with oxy(higher alkylene) groups represented by the general formula:

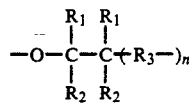

wherein $R_1$ and $R_2$ are hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains no more than two carbon atoms. Oxymethylene groups generally will constitute from about 85 to about 99.9 percent of the recurring units in such copolymers and are generally incorporated by ring-opening polymerization of trioxane in the presence of an acidic catalyst. The oxy(higher alkylene) groups are incorporated into the copolymer during ring-opening polymerization of trioxane by copolymerizing a cyclic ether or cyclic formal having at least two adjacent carbon atoms. The preferred oxy(higher alkylene) group is oxyethylene, having the formula:

$$-O-CH_2-CH_2-$$

Oxyethylene is incorporated into the polymer by copolymerization of ethylene oxide or 1,3-dioxolane with trioxane.

Acetal copolymers as described above, which have a structure consisting essentially of oxymethylene and oxyethylene groups, are thermoplastic materials having a melting point of at least 150° C. They normally are millable or processable at temperatures ranging from about 175° C. to about 200° C. and have a number average molecular weight of at least 10,000. They are normally highly crystalline, having a polymer crystallinity from about 60% to about 80% or greater.

A particularly preferred class of oxymethylene copolymers is commercially available under the name Celcon ® acetal copolymer. Celcon ® is a registered trademark of Hoechst Celanese Corporation. Celcon ® acetal is a copolymer made from about 98 weight % of trioxane and about 2 weight % ethylene oxide. Blends of the current invention may be made using any commercial grade of Celcon ® acetal polymer. Acetal copolymers are also available from other manufacturers under several trademarks, including Hostaform ®, Duracon ®, Ultraform ® and Iupital ®.

Oxymethylene terpolymers may also be used in making blends of the present invention. These comprise oxymethylene groups, oxy(higher alkylene) groups as described above, and a different third group derived from a bifunctional monomer interpolymerized with oxymethylene and oxy(higher alkylene) groups. The bifunctional monomer generally has the formula:

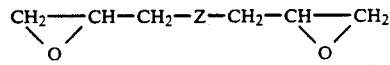

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly(lower alkoxy) group, preferably one having from 2 to 4 recurring lower alkoxy groups each with 1 or 2 carbon atoms. Examples include the diglycidyl ethers of ethylene glycol, 1,3-butanediol, and 1,4-butanediol, with the diglycidyl ether of 1,4-butanediol being preferred. A terpolymer as described above comprising about 98% by weight trioxane, about 2% by weight ethylene oxide, and about 0.05% by weight butanediol diglycidyl ether as the monomer units is commercially available from Hoechst Celanese Corporation under the name Celcon® U10 acetal polymer. More detailed descriptions of the methods for making oxymethylene-based copolymers and terpolymers and their compositions can be found in previously incorporated U.S. Pat. No. 4,758,608.

The crystalline acetal polymers may also contain additives, such as plasticizers, formaldehyde scavengers, nucleating agents, mold lubricants, antioxidants, fillers (e.g., glass fibers, beads, etc.), colorants, pigments, reinforcing agents, light stabilizers, other stabilizers, and the like. These all may be included in the blend so long as they do not detrimentally affect the blend, as, for example, by causing chemical decomposition of the acetal polymer.

Blends of the crosslinked elastomeric acetal polymers and crystalline acetal polymers can be made by any of the conventional methods that will result in a uniform blend. These methods are well known in the art. Typically, the crosslinked elastomeric acetal polymer, in the form of a dry solid, is dry mixed with the crystalline acetal polymer, which may be in the form of pellets, chips, flakes, granules or powder, usually at room temperature. The resulting mixture is melt blended in any conventional type extrusion equipment, which is customarily heated to a temperature from about 170° C. to about 220° C., and preferably from about 190° C. to about 210° C., for a time sufficient to give a uniform mixture. The sequence of addition is not critical. Various other additives, such as plasticizers, formaldehyde scavengers, nucleating agents, mold lubricants, antioxidants, fillers (e.g., glass fibers, beads, etc.), colorants, pigments, reinforcing agents, light stabilizers, other stabilizers and the like may also be added prior to melt blending, or these additives may have already been blended with one or both of the polymers to be blended. It may be necessary to grind the elastomeric acetal to a particle size suitable for impact modified blends. Grinding can be performed by any of the methods commonly used in the art for grinding elastomers, such as for example, cryogenic grinding.

Preferably, the crosslinked elastomeric acetal polymer and the crystalline acetal polymer are dried (either individually or together) before being subjected to the blending procedure. Drying can be done in desiccated air having a dew point of about −30° C. to −40° C. or lower, at a temperature of from about 70° C. to about 110° C. The drying time will depend primarily on the moisture content, drying temperature, and particular equipment employed, but typically is from about 2 to about 6 hours or more. If drying is conducted for longer periods of time, such as overnight, the drying temperature should preferably be about 70° C. to about 85° C. In general, any conventional drying procedure can be used to reduce the moisture content to below about 0.1 weight percent, based on the total weight of the unsaturated elastomeric acetal polymer and the crystalline oxymethylene polymer, preferably below about 0.05 weight percent, and most preferably below about 0.01 weight percent.

The uniform product obtained by the blending procedure is then comminuted mechanically, for example, by chopping, pelletizing or grinding into granules, pellets, chips, flakes or powders. The blend is finally processed in the thermoplastic state, for example by injection molding or extrusion molding, into shaped articles, including bars, rods, plates, sheets, films, ribbons, tubes, and the like. Preferably, prior to molding, the comminuted blend is dried again, in the manner discussed above.

In order that those skilled in the art can more fully understand this invention, the following non-limiting examples are recited.

EXAMPLE 1

2,3-Epoxypropyl acrylate and 1,3-dioxolane were distilled and dried prior to use. 2,3-Epoxypropyl acrylate (25 ml) and 1,3-dioxolane (225 ml) were combined in a flask inside a glove box having a dry, inert atmosphere, and the flask was then sealed. The sealed flask, which was continuously purged with nitrogen, was immersed in an oil bath which was kept at about 55° C. A solution of about 6% p-nitrobenzenediazonium tetrafluoroborate in dry nitromethane was made up, and a sufficient amount of this was added by syringe to the heated monomer solution to yield a monomer solution that was 0.001M in p-nitrobenzenediazonium tetrafluoroborate. After polymerization, the gelatinous polymeric product was dissolved in about 200 ml of dichloromethane.

EXAMPLE 2

Substantially the same procedure was followed as in Example 1, except that polymerization was first attempted by adding 1.3 $\mu$l of trifluoromethanesulfonic acid anhydride (triflic anhydride) to the monomers. When this failed, polymerization was initiated with p-nitrobenzenediazonium tetrafluoroborate, as was done in Example 1. A yellow, rubbery polymer was obtained. About 10 ml of liquid remained, which was decanted from the polymer before it was dissolved in dichloromethane.

EXAMPLE 3

A solution of 12.5 ml of 2,3-epoxypropyl acrylate and 237.5 ml of 1,3-dioxolane was made up and polymerized using the same procedure that was used in Example 1. A rubbery product was again obtained.

EXAMPLE 4

A solution of 25 ml of 2,3-epoxypropyl acrylate and 225 ml of 1,3-dioxolane was made up under a dry, inert atmosphere using the same procedure as in Example 1. The nitrogen-purged flask was immersed in a 55° C. oil bath. A solution of 35 $\mu$l of boron trifluoride etherate in 5 ml of nitromethane was made up, and a sufficient amount of this was added to the monomer solution under nitrogen to yield a monomer solution that was 0.001M in boron trifluoride etherate. After standing overnight, the flask contained a gelatinous polymer with a small amount of clear supernatant liquid. The flask was frozen in liquid nitrogen and then crushed so that the frozen polymer could be removed.

EXAMPLE 5

The crosslinked elastomeric acetal of Example 1 is ground to a small particle size. Mixtures of this crosslinked material with Celcon ® acetal resin, from Hoechst Celanese Corporation, are prepared containing 2%, 5%, 10%, 15%, 20%, 25% and 30% of the crosslinked elastomer by mixing the ground crosslinked elastomer at room temperature in a dry atmosphere with Celcon ® acetal copolymer. The Celcon ® acetal polymer in granulated form is first dried by heating to 75° C. overnight in a dry atmosphere. The mixture of Celcon ® acetal polymer and cured elastomer are then blended in an extruder at 190°-210° C. A molding resin with improved impact strength is obtained.

It is to be understood that the above-described embodiments of the invention are illustrative only and that modification throughout may occur to one skilled in the art. Accordingly, this invention is not to be regarded as limited to the embodiments disclosed herein but is to be limited and defined only by the appended claims.

What is claimed is:

1. A crosslinked elastomeric acetal polymer consisting of monomer units derived from (a) 1,3-dioxolane; and (b) one or more bifunctional monomers having the formula:

$$X-R-Y$$

wherein X and Y are reactive functional groups, which are identical or different, and are selected from the group consisting of epoxides, glycidyl ethers, glycidyl esters, cyclic ethers, vinyl ethers, vinyl esters, acrylate esters, methacrylate esters, allyl ethers, and allyl esters, and R is a linkage that does not react under conditions of cationic polymerization, wherein said monomer units derived from said 1,3-dioxolane and from said bifunctional monomers are incorporated in amounts that yield a crosslinked polymer that is essentially non-crystalline at room temperature.

2. A crosslinked elastomeric acetal polymer, as recited in claim 1, wherein said bifunctional monomer is 2,3-epoxypropyl acrylate.

3. A crosslinked elastomeric acetal polymer, as recited in claim 1, wherein said monomer units derived from said 1,3-dioxolane and from said bifunctional monomer are incorporated in amounts that result from polymerization of a solution of about 99% to about 80% by volume of said 1,3-dioxolane and about 1% to about 20% by volume of said bifunctional monomer.

4. A crosslinked elastomeric acetal polymer, as recited in claim 1, wherein said monomer units derived from said 1,3-dioxolane and from said bifunctional monomer are incorporated in the amounts that result from polymerization of a solution of about 95% to about 90% by volume of said 1,3-dioxolane and about 5% to about 10% by volume of said bifunctional monomers.

5. A crosslinked elastomeric acetal polymer consisting of monomer units derived from (a) 1,3-dioxolane; and (b a crosslinking amount of 2,3-epoxypropyl acrylate.

* * * * *